(12) United States Patent
Doi et al.

(10) Patent No.: US 7,798,564 B2
(45) Date of Patent: Sep. 21, 2010

(54) REINFORCING MEMBER FOR VEHICLE

(75) Inventors: Toshihiro Doi, Tokyo (JP); Hideharu Tatsumi, Tokyo (JP); Toshihisa Sakuma, Tokyo (JP); Katsuyoshi Tanaka, Tokyo (JP); Hiromi Tamou, Tokyo (JP); Kouichi Hirota, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 737 days.

(21) Appl. No.: 11/316,193

(22) Filed: Dec. 22, 2005

(65) Prior Publication Data

US 2006/0220420 A1 Oct. 5, 2006

(30) Foreign Application Priority Data

Dec. 27, 2004 (JP) ............................. 2004-376586
Dec. 27, 2004 (JP) ............................. 2004-376608

(51) Int. Cl.
*B62D 25/20* (2006.01)

(52) U.S. Cl. ................... 296/193.07; 280/782; 280/784

(58) Field of Classification Search ............ 296/187.08, 296/193.07, 204, 205, 190.01, 190.08; 280/124.108, 280/795, 796, 782, 784
See application file for complete search history.

(56) References Cited

U.S. PATENT DOCUMENTS

| | | | | |
|---|---|---|---|---|
| 4,514,008 A * | 4/1985 | Watanabe et al. | ........... | 296/204 |
| 5,011,321 A * | 4/1991 | Kidokoro | ................... | 403/140 |
| 5,427,467 A * | 6/1995 | Sugiura | ...................... | 403/140 |
| 5,611,593 A * | 3/1997 | Fukagawa et al. | ........... | 296/204 |
| 6,206,460 B1 * | 3/2001 | Seeliger et al. | ............. | 296/204 |
| 6,382,710 B1 * | 5/2002 | Funk et al. | ............. | 296/187.12 |
| 6,431,569 B2 * | 8/2002 | Handa | ................. | 280/124.138 |
| 6,595,533 B2 | 7/2003 | Sawai et al. | ........... | 280/124.108 |
| 7,419,173 B2 * | 9/2008 | Nakajima | ............ | 280/124.107 |
| 7,673,904 B2 * | 3/2010 | Harada et al. | ............... | 280/782 |
| 2003/0180089 A1* | 9/2003 | Heuser et al. | ............... | 403/135 |
| 2004/0155427 A1* | 8/2004 | Nakajima | ............ | 280/124.166 |
| 2005/0110303 A1* | 5/2005 | Neumeier et al. | ........... | 296/204 |
| 2006/0125225 A1* | 6/2006 | Kondou et al. | ............. | 280/781 |

FOREIGN PATENT DOCUMENTS

| JP | 2002-211437 | | 7/2002 |
|---|---|---|---|
| JP | 2003252240 A | * | 3/2009 |
| WO | WO-2004009428 A1 | * | 1/2004 |
| WO | WO-2005077738 | * | 8/2005 |

* cited by examiner

*Primary Examiner*—Jason S Morrow
(74) *Attorney, Agent, or Firm*—Smith, Gambrell & Russell, llp

(57) ABSTRACT

A reinforcing member for vehicles comprises a pair of fixed parts fastened on spaced-apart portions of a vehicle body, and a bar body for connecting the respective fixed parts. A rotation allowing mechanism is provided on at least one of the fixed parts in order to allow the bar body to rotate with respect to the vehicle body. Therefore, the respective two portions of the vehicle body, on which the fixed parts are fastened respectively, are allowed to have angle variations to each other without changing the space between the two portions of the vehicle body. Consequently, the rigidity of the entire vehicle body can be improved without the degradation in the drivability and the ride comfortableness of the vehicle.

25 Claims, 4 Drawing Sheets

REINFORCING MEMBER FOR VEHICLE

BACKGROUND OF THE INVENTION

The present invention relates to a reinforcing member for a vehicle body for connecting a spaced-apart portion thereof, particularly to the reinforcing member of a vehicle for suppressing a deformation of a vehicle body panel while the vehicle is running.

The reinforcing member for the vehicle is often used in the vehicle for suppressing the deformation of the vehicle body panel, a relative displacement of each part of the vehicle body, or the like, which occurs while the vehicle is moving. As is well known, this kind of reinforcing member includes a sheet-like reinforcing member made of resin for improving a rigidity of the vehicle body panel itself, a panel-like reinforcing member made of a metal and welded on back side of the vehicle body panel, the reinforcing member made of the metal for connecting the two spaced-apart portions of the vehicle body, or the like.

The following configuration has been proposed for improving the rigidity of the entire vehicle body by connecting the two spaced-apart portions of the vehicle body. A bar-shaped member mounted across the two portions is divided into two parts, the one part of which is provided with a cylinder, and the other part of which is provided with a piston that slides to contact with an inner periphery side of the cylinder (For example, see Patent Application Laid-open No. 2002-211437). Inside the cylinder is formed by two oil chambers filled with oil. When the piston slides in the cylinder upon an elastic motion of the bar-shaped member, the oil flows through orifices penetrating a piston ring so as to obtain a damping force.

However, the structure of the vehicle body as described above, has a problem that the vehicle body with the reinforcing member firmly fixed thereon is partially twisted when a load is applied to the reinforcing member, which results to decrease a drivability and a ride comfortableness thereon. There is likely to be another problem that a stress easily concentrates near a fixed part of the reinforcing member or in other weak areas of the vehicle body as the vehicle body is partially twisted, and as a consequence, a strength or a reliable durability of the vehicle body is partially decreased.

SUMMARY OF THE INVENTION

The present invention has been developed in view of aforementioned problems. It is an object of the present invention to provide a reinforcing member for vehicle which can improve a rigidity of an entire vehicle body without degradation in a drivability and a ride comfortableness of the vehicle.

In order to achieve above-mentioned objects, a reinforcing member for a vehicle body structure of a vehicle according to a first aspect of the present invention comprises a pair of fixed parts fastened on a spaced-apart portion of the vehicle body structure, a reinforcing connection part for connecting the fixed part, and a rotation allowing mechanism provided on at least one of said fixed parts in order to allow the reinforcing connection part to rotate with respect to the vehicle body structure. It should be noted that the reinforcing connection part may be rotated in uniaxial, biaxial, and triaxial directions.

According to the first aspect of the present invention, the rotation allowing mechanism is provided on at least one of the fixed parts so as to allow the reinforcing connection part to rotate with respect to the vehicle body. Therefore, the respective two portions of the vehicle body, on which the fixed parts are fastened respectively, are allowed to have angle variations to each other without changing the space between the two portions. Consequently, even if loads are applied to the reinforcing member, the vehicle body is not partially twisted so as not to impair the drivability and the ride comfortableness of the vehicle. Because the space between the two portions of the vehicle body remains unchanged, the entire vehicle body can obtain the rigidity. Furthermore, as the vehicle body is not partially twisted, a stress concentration generated in a part of the vehicle body can be prevented.

According to a second aspect of the present invention, the reinforcing member for the vehicle in the first aspect includes the rotation allowing mechanism having a pillow ball.

According to the second aspect of the present invention, in addition to functions of the first aspect, it is easy and simple to rotate the reinforcing connection part with respect to the vehicle body by means of the rotation allowing mechanism having the conventionally known pillow ball.

According to a third aspect of the present invention, the reinforcing connection part of the reinforcing member for the vehicle, described in the first or second aspect, is a bar-shaped member mounted on a floor panel of the vehicle body by means of the fixed parts so as to cross a recessed portion formed on the floor panel.

According to the third aspect of the present invention, in addition to the functions of the first or second aspect, the reinforcing member for the vehicle can suppress the deformation of the recessed portion of the floor panel while the vehicle is moving. Although the opening of the recessed portion of the floor panel is substantially displaced when such a force as a pressure or a tension affects the floor panel, the rigidity of the floor panel can be effectively improved by suppressing the deformation of the recessed portion. Also, the torsional rigidity of the vehicle body is drastically improved by suppressing the deformation of the floor panel that forms the part of the ring-like structure of the vehicle body together with right and left pillars, a roof panel, or the like.

According to a fourth aspect of the present invention, the reinforcing member for the vehicle in the third aspect is provided with a biasing mechanism for biasing an elastically formed reinforcing connection part in a stretching direction.

According to the fourth aspect of the present invention, in addition to the functions of the third aspect, the spaced-apart portions of the vehicle body are biased by the biasing mechanism so that preloads are applied to the respective panels of which the vehicle body is composed. The applied preloads move the respective panels of the vehicle body so as to reduce a clearance (or looseness) between the panels. Consequently, there is a progress in the response of the vehicle body against an input force from a road surface while the vehicle is moving, which results in a remarkable improvement of the drivability and the ride comfortableness of the vehicle.

According to a fifth aspect of the present invention, the reinforcing member for the vehicle in the forth aspect is provided with a damping mechanism for damping the elastic motion of the reinforcing connection part.

According to the fifth aspect of the present invention, in addition to the functions of the fourth aspect, the reinforcing member for the vehicle is configured to damp the elastic motion of the reinforcing connection part. An elastic effect can be provided on a vibration when the vibration is transmitted from the road surface to the vehicle body through a suspension in the running vehicle so as to expand and contract the reinforcing connection part. Accordingly, the vibration transmitted from the road surface to the vehicle body through the suspension can be effectively controlled and further, the drivability and the ride comfortableness of the vehicle can be improved.

As described above, the reinforcing member for the vehicle according to the present invention can improve the rigidity of the entire vehicle body without the degradation in the drivability and the ride comfortableness of the vehicle.

BRIEF DESCRIPTION OF THE DRAWINGS

These and other objects and advantages of the present invention will become understood from the following description with reference to accompanying drawings, wherein.

DETAILED DESCRIPTION OF THE PREFERRED EMBODIMENTS

Figure 1:
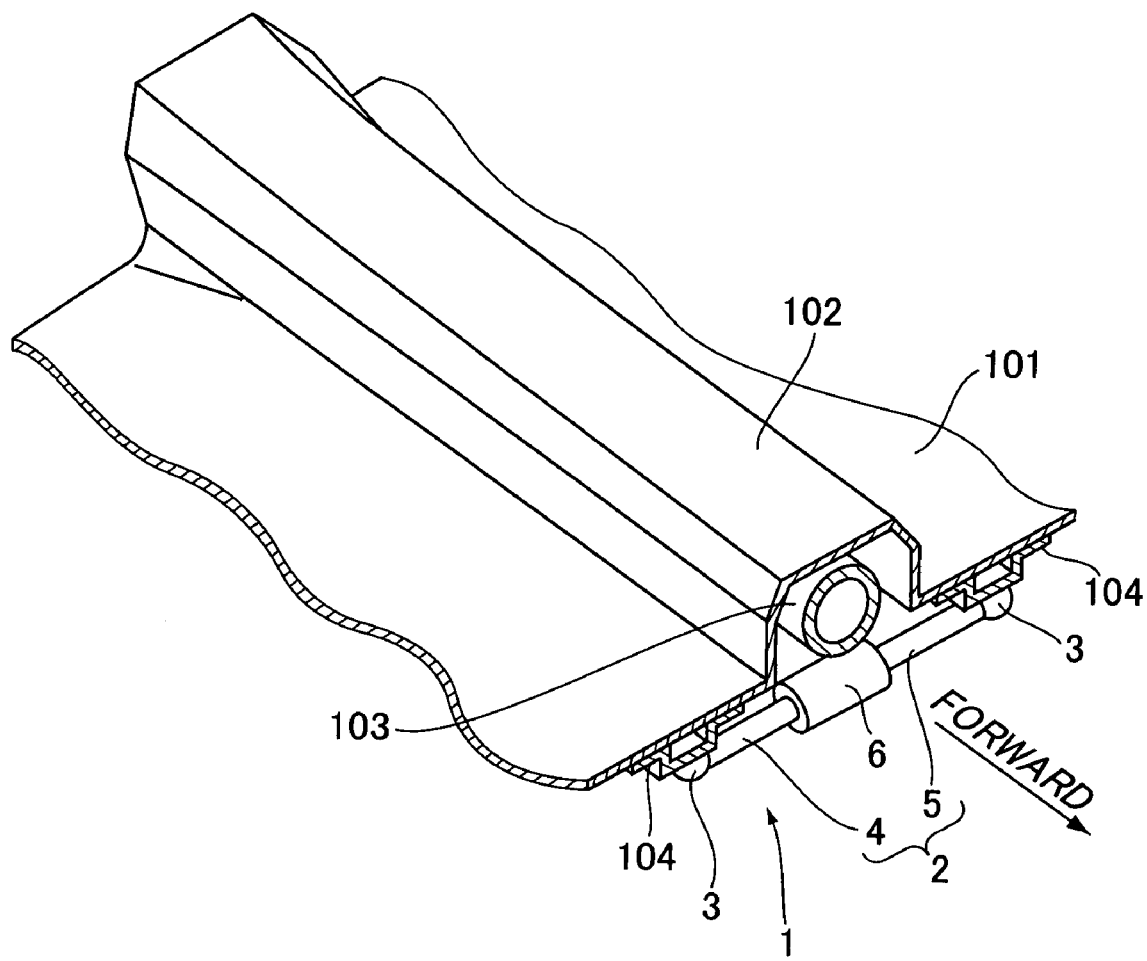
FIG. 1 is a first embodiment of the present invention showing a schematic perspective view for illustrating a structure of a vehicle body having a reinforcing member for a vehicle mounted on a floor panel.

FIGS. 1 to 4 show a first embodiment of the present invention. As shown in FIG. 1, the reinforcing member 1 for the vehicle according to the present embodiment reinforces a floor tunnel 102, which is formed on a floor panel 101 of the vehicle body and which extends forwardly and rearwardly. The floor tunnel 102 is formed in a substantially inverted hat-shape in a cross sectional shape viewed from a front direction and, in the embodiment shown, features a common panel as the floor panel that has first and second floor portions and an intermediate tunnel. The floor tunnel 102 provides a propeller shaft 103 therein for transmitting a driving force generated by a power source mounted on a front part of the vehicle body.

The reinforcing member 1 comprises a main bar body 2 and two fixed parts 3. The main bar body 2 is mounted on the floor panel 101 so as to cross the floor tunnel 102 that is in a recessed portion. The two fixed parts 3 are formed on both ends of the main bar body 2 that is a reinforcing connection part. The respective fixed parts 3 are fastened on the undersurface of the floor panel 101. According to the first present embodiment, on the undersurface of the floor panel 101 is attached with a pair of brackets 104 on which the fixed parts 3 are fastened respectively.

Figure 2:
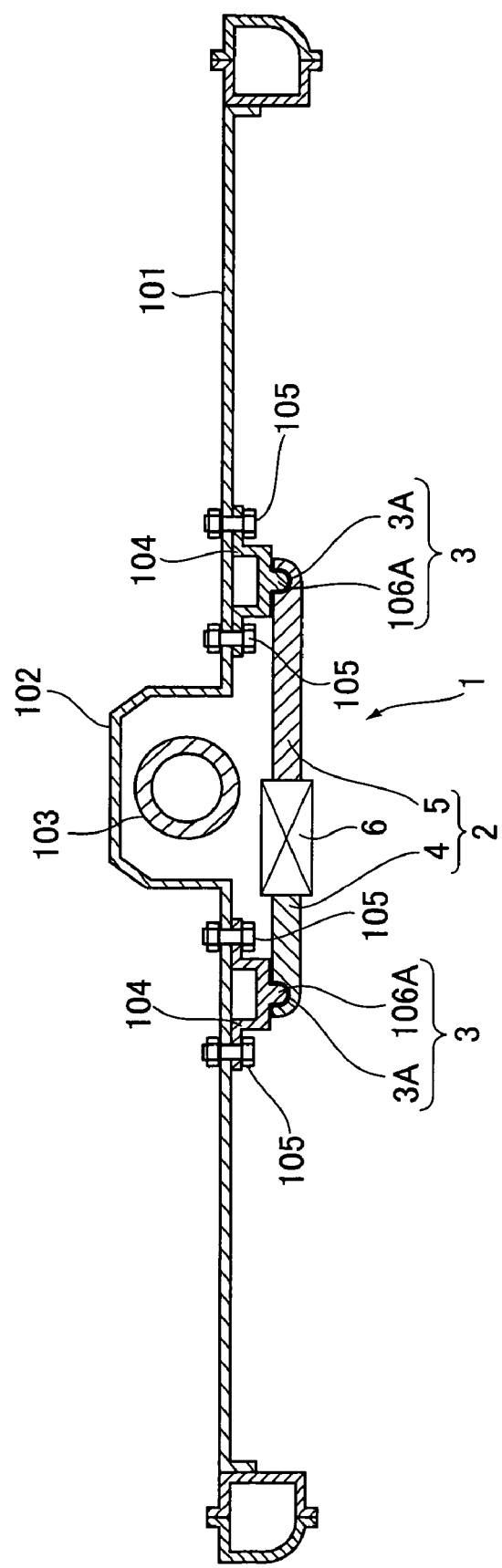
FIG. 2 is a schematic front sectional view for illustrating the structure of the vehicle body having the reinforcing member of a pillow ball type for the vehicle mounted on the floor panel.

As shown in FIG. 2, the respective brackets 104 are formed in a substantially inverted hat-shape in a cross section viewed from a forward direction. The bracket 104 is tightly fastened to the floor panel 101 with a plurality of bolts 105. On each bracket 104 is formed a downward projecting sphere 106A, by means of which the reinforcing member 1 is fixed on the bracket 104. The fixed parts 3 are provided with recessed portions 3A for receiving the spheres 106A, respectively. A so-called pillow ball is comprised of the sphere 106A and the recessed portion 3A of the fixed part 3. In the above configuration, the main bar body 2 is allowed to rotate with respect to the vehicle body.

Figure 3:
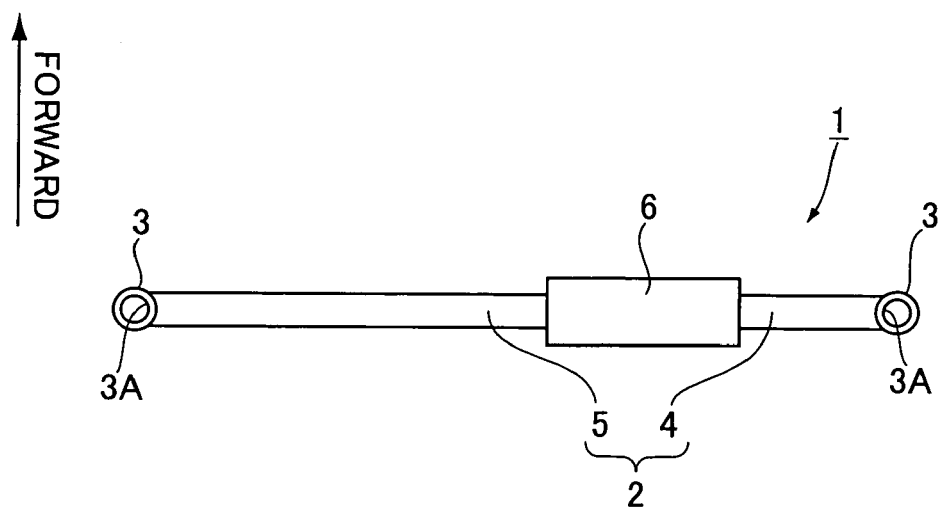
FIG. 3 is a top view of the reinforcing member for the vehicle.
Figure 4:
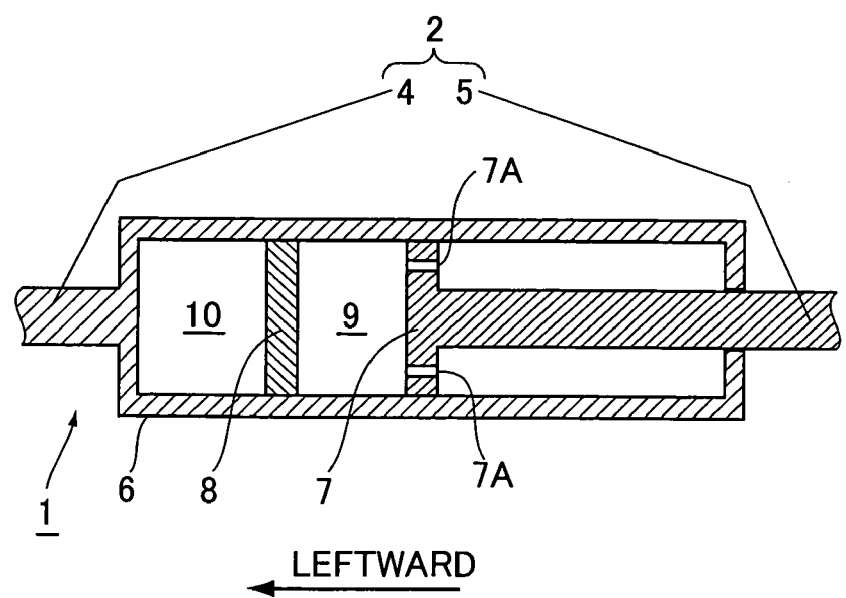
FIG. 4 is a sectional view of a part of the reinforcing member for vehicles.

As shown in FIG. 3, the main bar body 2 is divided into a right side bar 4 and a left side bar 5, and is formed to be elastic (or flexible) in an axial direction through the use of a gas damper mechanism capable of expanding and contracting. According to the present first embodiment, as in FIG. 4, a cylinder 6 extending in an axial direction is provided on a left end of the right side bar 4. A piston 7 provided on a right end of the left side bar 5 slides to contact with the inner periphery side of the cylinder 6. The inside of the cylinder 6 is hermetically closed, wherein a free piston 8 provided on the right side of the piston 7 slides to contact with the inner periphery side of the cylinder 6 and separates the insides of the cylinder 6 in an axial direction. The left side of the free piston 8 forms an oil chamber 9 filled with oil, and the right side of the free piston 8 forms a gas chamber 10 filled with gas.

By making an adjustment to the pressure inside the oil chamber 9 and the gas chamber 10, the main bar body 2 has the length which is longer than the corresponding length of the space between the respective brackets 104, when the reinforcing member 1 is detached from the vehicle body. While the reinforcing member 1 is mounted on the vehicle body as shown in FIG. 1, the contracted bar body 2 makes the gas chamber 10 become more compressed than usual. The pressure from the gas chamber 10 is applied to the free piston 8, and thereby the main bar body 2 is biased in a stretching direction. In other words, a biasing mechanism that is comprised of the cylinder 6, the free piston 8, and the like includes the gas damper for obtaining the damping force in the stretching direction by means of the gas.

On the piston 7 is formed a plurality of openings 7A that communicates between the oil chamber 9 and the right side thereof. Therefore, when the piston 7 moves inside the oil chamber 9 in an axial direction in accordance with the elastic motion of the main bar body 2, there can be provided a damping effect for damping the elastic motion of the main bar body 2 by a resistant force that occurs when the oil flows through the respective openings 7A. Specifically, the damping mechanism is comprised of the cylinder 6, the piston 7, and the like.

According to the reinforcing member 1 configured as above, the fixed parts 3 are provided with the recessed portions 3A respectively for allowing the rotation with respect to the sphere 106A affixed on the side of the floor panel 101. Consequently, the respective two portions of the floor panel 101, on which the fixed parts 3 are fastened respectively, are allowed to have angle variations to each other on the floor panel 101 without changing the space between the two portions. Therefore, even if loads are applied to the reinforcing member for the vehicle 1, the floor panel 101 is not partially twisted so as not to impair the drivability and the ride comfortableness of the vehicle. Because the space between the two portions of the floor panel 101 remains unchanged, the entire vehicle body can obtain a rigidity. Furthermore, as the floor panel 101 is not partially twisted, a stress concentration generated in a specific part of the floor panel 101 can be prevented.

According to the reinforcing member 1 of the present first embodiment, it is easy and simple to allow the rotation relative to the vehicle body by means of a rotation allowing mechanism comprised of the conventionally known pillow ball.

The reinforcing member for vehicles 1 according to the present first embodiment can suppress the deformation of the floor tunnel 102 formed on the floor panel 101 while the vehicle is moving. Although the opening of the recessed portion of the floor panel 101 is substantially displaced when such a force as a pressure or a tension affects the floor panel 101, the rigidity of the floor panel 101 can be effectively improved by suppressing the deformation of the recessed portions. Also, the torsional rigidity of the vehicle body is drastically improved by suppressing the deformation of the floor panel 101 that forms a part of the ring-like structure of the vehicle body together with right and left pillars, a roof panel, or the like.

According to the reinforcing member 1 of the present first embodiment, the spaced-apart portions on the floor panel 101 are biased by the biasing mechanism so that preloads are applied to the respective panels of which the vehicle body is composed. The applied preloads move the respective panels of the vehicle body so as to reduce the "clearance" (or looseness) between the panels. Consequently, there is an improvement in the response of the vehicle body to the input force from the road surface while the vehicle is moving, which results in the remarkable improvement of the drivability and the ride comfortableness of the vehicle.

The reinforcing member 1 according to the present first embodiment is configured to damp the elastic motion of the bar body 2. The damping effect can be provided on vibration when the vibration is transmitted from the road surface to the vehicle body through a suspension in the running vehicle so as to expand and contract the main bar body 2. Accordingly, the vibration transmitted from the road surface to the vehicle body through the suspension can be effectively controlled, which can improve the drivability and the ride comfortableness of the vehicle.

It should be noted that, although the foregoing first embodiment shows the case where the main bar body 2 crosses the floor tunnel 102 formed on the floor panel 101, the main bar body 2 may be mounted to cross the other recessed portions, such as a storage unit for spare tires which is formed on the floor panel 101 such that the storage unit projects downward with a recessed upper side. Furthermore, the portion where the fixed part is fastened is not limited to the floor panel 101 of the vehicle body. As long as the respective fixed parts are fastened on the spaced-apart portions of the vehicle body, the fixed parts 3 may be mounted on other portions.

Figure 5:
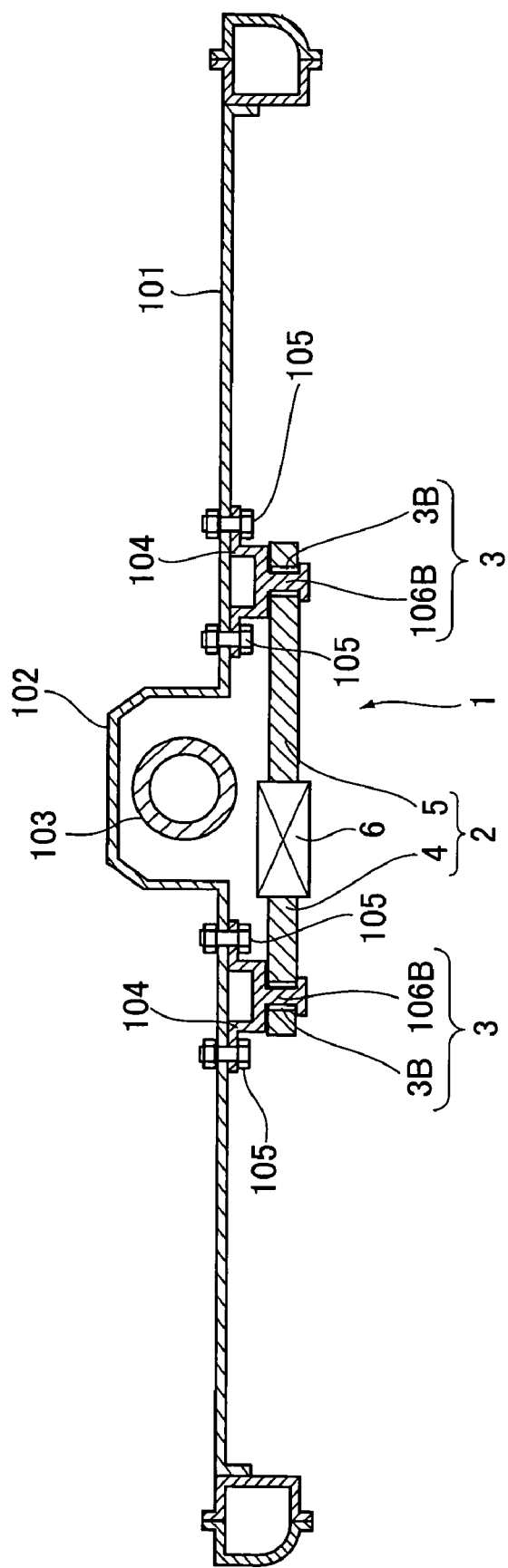
FIG. 5 is the schematic front sectional view of the second embodiment for illustrating the structure of the vehicle body having the reinforcing member with a pin and a bearing mounted on the floor panel.

Although the rotation allowing mechanism according to the above first embodiment is comprised of the pillow ball, there may be other configurations of the rotation allowing mechanism. For example, as shown in FIG. 5 as the second embodiment, the rotation allowing mechanism may be formed with bearings 3B, into which a cylindrical pin member 106B provided on the side of the vehicle body is inserted. The second embodiment shows that the two fixed parts 3 can rotate relative to the floor panel 101. However, if either one of the fixed parts 3 is rotative with respect to the floor panel 101, the respective two portions of the floor panel 101, on which the fixed parts 3 are fastened respectively, are allowed to have the angle variations to each other without changing the space between the two portions.

In the above-described first and second embodiments, the main bar body 2 is biased by the biasing mechanism using the pressure of the gas filled in the gas chamber 10. The biasing mechanism, however, may bias the main bar body 2 by means of the elastic force of elastic bodies such as springs and rubbers. It should be noted that it is possible to provide no biasing mechanisms in the configuration. Although the both embodiments shows that the elastic motion of the main bar body 2 is damped by using a viscosity resistant force of the oil filled in the oil chamber 9, the damping mechanism may damp the elastic motion, for instance, by a combination of friction plates. It should be noted that it is possible to provide no damping mechanisms in the configuration.

Although the above-described first and second embodiments show the case where the main bar body 2 of the bar-shaped member is used as the reinforcing connection part, the shape of the reinforcing connection part is not limited to a bar-shape. For example, the reinforcing connection part may be a plate-like member or in a bending form. Furthermore, the fixed part may be firmly fixed to the vehicle body. Naturally, other specific structural details can be changed accordingly.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A reinforcing member assembly, comprising:
  a floor panel;
  a reinforcing member for a vehicle body structure of a vehicle comprising a pair of fixed parts separately fastened on the floor panel of said vehicle body structure, a reinforcing connection part for connecting said fixed parts, and a rotation allowing mechanism provided on at least one of said fixed parts in order to allow said reinforcing connection part to rotate with respect to said vehicle body structure upon a vehicle travel induced adjustment in said vehicle body structure;
  a recessed portion formed on the floor panel; and
  a propeller shaft provided in the recessed portion,
  wherein the reinforcing member is fastened to said floor panel and crosses the propeller shaft, and wherein said reinforcing connection part comprises a biasing mechanism, and wherein said floor panel comprises a floor tunnel, as the recessed portion, and first and second floor portions, said fixed parts being fixed to said first and second floor portions, respectively, and wherein said fixed parts are spaced apart a distance on said floor and which places the biasing mechanism of the reinforcing connection part in a state of compression such that preloads are applied to the respective first and second floor portions by the reinforcing connection part.

2. The reinforcing member assembly according to claim 1, wherein said rotation allowing mechanism has a pillow ball.

3. The reinforcing member assembly according to claim 1, wherein said reinforcing connection part is a bar-shaped member mounted on the floor panel of said vehicle body structure by means of said fixed parts.

4. The reinforcing member assembly according to claim 3, wherein said biasing mechanism elastically biases said reinforcing connection part in a stretching direction.

5. The reinforcing member assembly according to claim 4, further comprising a damping mechanism for damping an elastic motion of said reinforcing connection part.

6. A vehicle reinforcing member assembly comprising:
  a floor panel;
  a reinforcing member for a vehicle body structure of a vehicle comprising a pair of fixed parts separately fastened on the floor panel of said vehicle body structure, a reinforcing connection part connected to said fixed parts for expanding and contracting, and a biasing mechanism for biasing said reinforcing connection part in an extending direction;
  a recessed portion formed on the floor panel; and
  a propeller shaft provided in the recessed portion,
  wherein the reinforcing member is fastened to said floor panel and crosses the propeller shaft, and wherein said floor panel comprises a floor tunnel, as the recessed portion, and first and second floor portions, said fixed parts being fixed to said first and second floor portions, respectively, and wherein said fixed parts are spaced apart a distance on said floor panel which places the biasing mechanism of the reinforcing connection part in a state of compression such that preloads are applied to the respective first and second floor portions by the reinforcing connection part.

7. The reinforcing member assembly according to claim 1, wherein said floor tunnel and said first and second portions are formed from a common panel.

8. The reinforcing member assembly according to claim 6, wherein said floor tunnel and said first and second portions are formed from a common panel.

9. The reinforcing member assembly according to claim 6, wherein said biasing mechanism includes a gas damper.

10. The reinforcing member assembly according to claim 6, wherein said reinforcing connection part is a bar-shaped member mounted on the floor panel of said vehicle body structure by means of said fixed parts.

11. The reinforcing member assembly according to claim 6, further comprising a damping mechanism for damping an elastic motion of said reinforcing connection part in a stretching direction.

12. A vehicle reinforcing member assembly comprising:
a floor panel;
a reinforcing member for a vehicle body structure of a vehicle comprising, a pair of fixed parts separately fastened on the floor panel of said vehicle body structure, a reinforcing connection part connected to said fixed parts for expanding and contracting, and a biasing mechanism for biasing said reinforcing connection part in an extending direction;
wherein the reinforcing member is fastened to said floor panel in a compressed state so as to bias said reinforcing connection part in the extending direction.

13. The vehicle reinforcing member assembly according to claim 12, further comprising a rotation allowing mechanism provided on at least one of said fixed parts in order to allow said reinforcing connection part to rotate with respect to said vehicle body structure upon a vehicle travel induced adjustment in said vehicle body structure.

14. The vehicle reinforcing member assembly according to claim 13, wherein said rotation allowing mechanism has a pillow ball.

15. The vehicle reinforcing member assembly according to claim 12, further comprising a damping mechanism for damping an elastic motion of said reinforcing connection part.

16. The vehicle reinforcing member assembly according to claim 12, wherein said floor panel comprises a floor tunnel and first and second floor portions, said fixed parts being fixed to said first and second floor portions, respectively, and said floor tunnel and said first and second portions being formed from a common panel.

17. The vehicle reinforcing member assembly according to claim 16 wherein a width of the floor tunnel in the extending direction is less than that of the first floor portion and less than that of the second floor portion.

18. The vehicle reinforcing member assembly according to claim 16, further comprising respective rotation allowing mechanisms provided to each of said fixed parts in order to allow said reinforcing connection part to rotate with respect to said vehicle body structure upon a vehicle travel induced adjustment in said vehicle body structure, and wherein the first and second fixed parts are positioned such that rotation of the reinforcing connection part takes place in an area of the floor panel extending between a respective edge of said tunnel and a respective free end of said first and second floor portions.

19. The vehicle reinforcing member assembly according to claim 12, wherein said biasing mechanism includes a gas damper.

20. The vehicle reinforcing member assembly according to claim 12, further comprising a recessed portion formed on the floor panel, and a propeller shaft provided in the recessed portion,
wherein the reinforcing member is fastened to said floor panel and crosses the propeller shaft.

21. The reinforcing member assembly according to claim 1 wherein said biasing mechanism is comprised of a cylinder and a free piston with the free piston received in the cylinder as to define a gas chamber to one side of said free piston and an oil chamber to an opposite side of said free piston, and said biasing mechanism further comprising a second, oil contact piston that is received by said cylinder and contacts oil in said oil chamber.

22. The reinforcing member assembly according to claim 21 wherein said second piston has a head with a plurality of oil flow ports formed in the head.

23. The reinforcing member assembly according to claim 6 wherein said biasing mechanism is comprised of a cylinder and a free piston with the free piston received in the cylinder as to define a gas chamber to one side of said free piston and an oil chamber to an opposite side of said free piston, and said biasing mechanism further comprising a second, oil contact piston that is received by said cylinder and contacts oil in said oil chamber.

24. The reinforcing member assembly according to claim 23 wherein said second piston has a head with a plurality of oil flow ports formed in the head.

25. The vehicle reinforcing member assembly according to claim 12, wherein said reinforcing connection part is a bar-shaped member mounted on the floor panel of said vehicle body structure by means of said fixed parts so as to cross a recessed portion formed on said floor panel.

* * * * *